Figure 1:
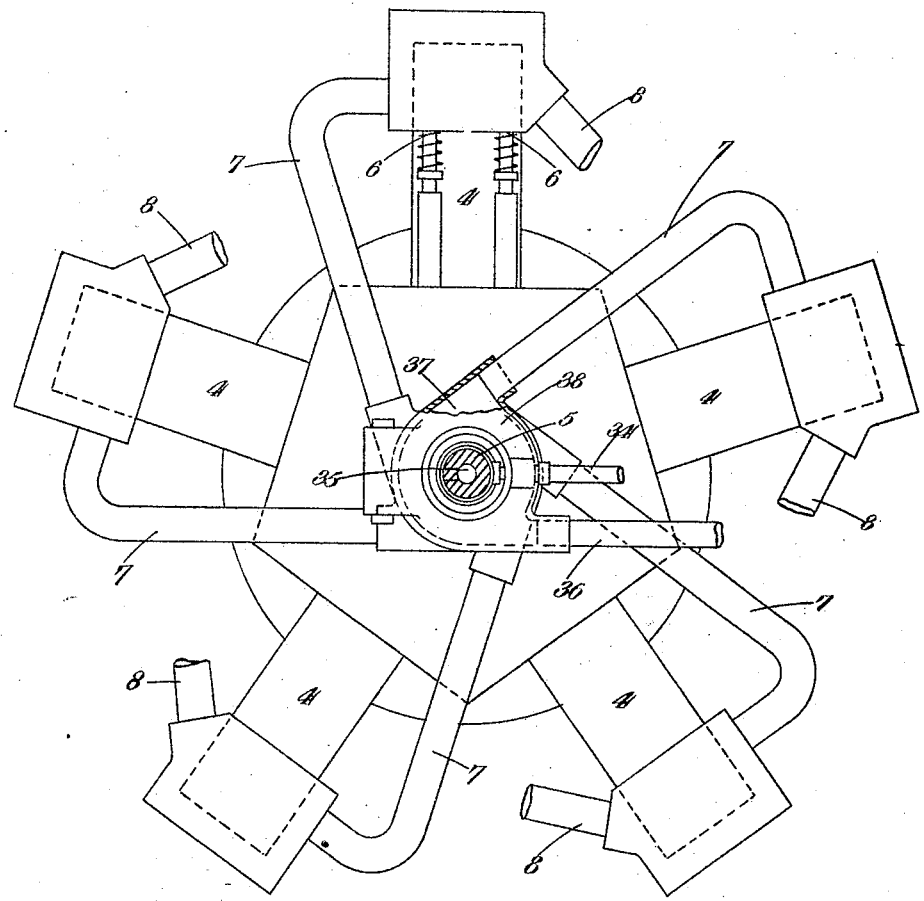

June 1, 1926.

O. D. NORTH 1,587,406

INTERNAL COMBUSTION ENGINE FOR MOTOR VEHICLES

Filed March 20, 1923    4 Sheets-Sheet 1

Inventor
Oliver D. North
by Wilkinson & Gusta
Attorneys.

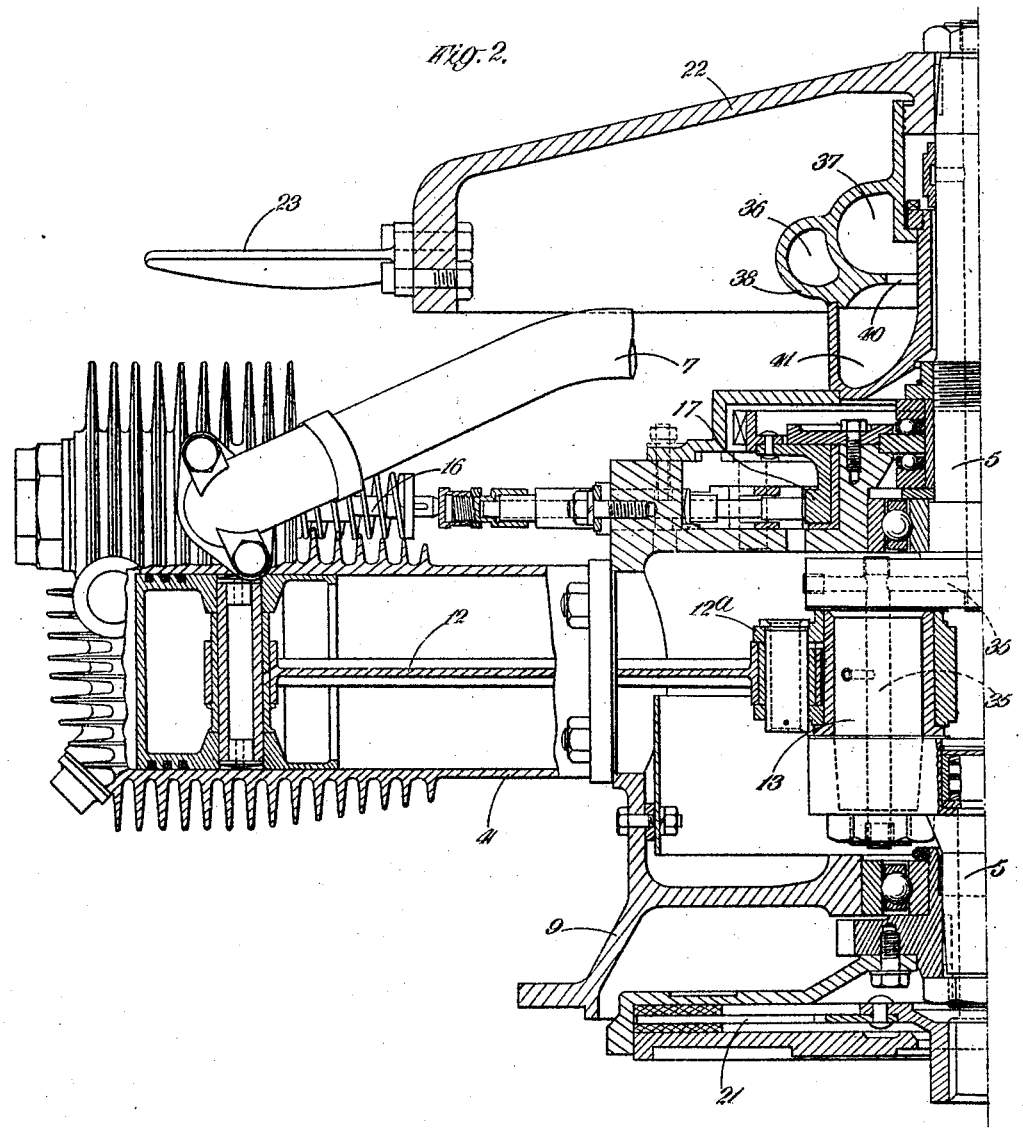

June 1, 1926.
O. D. NORTH
1,587,406
INTERNAL COMBUSTION ENGINE FOR MOTOR VEHICLES
Filed March 20, 1923     4 Sheets-Sheet 3
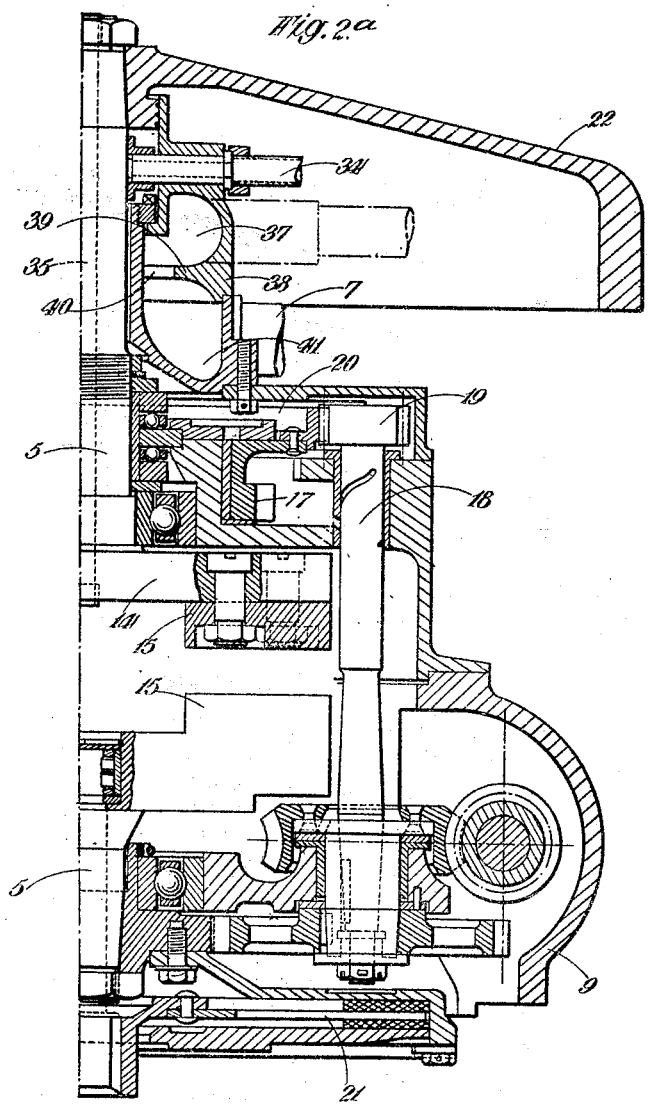
Inventor
Oliver D. North
by Wilkinson & Giusta
Attorneys.

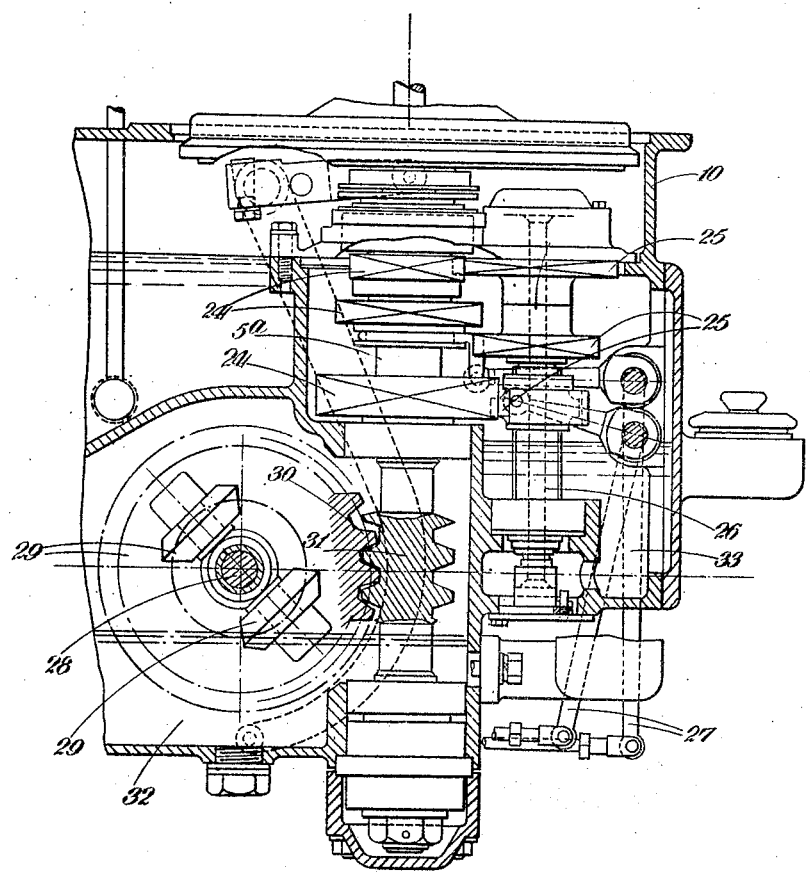

Patented June 1, 1926.

1,587,406

UNITED STATES PATENT OFFICE.

OLIVER DANSON NORTH, OF LONDON, ENGLAND.

INTERNAL-COMBUSTION ENGINE FOR MOTOR VEHICLES.

Application filed March 20, 1923, Serial No. 626,389, and in Great Britain March 30, 1922.

This invention relates to improvements in internal combustion engines of the type in which two or more cylinders are arranged around the crankshaft axis usually at equal intervals.

According to the present invention the engine is mounted with its crankshaft axis in a vertical plane, the cylinders projecting radially outwards in a horizontal plane, the crankcase being integral with or rigidly secured to a casing containing suitable change speed, transmission and differential gearing, arranged beneath the engine.

Thus a complete compact unit, comprising the engine change speed, transmission and differential gearing, is provided which may be arranged between the front or rear wheels of a vehicle leaving the rest of the chassis space entirely free from machinery.

The power is transmitted from the casing to the two adjacent road wheels preferably by short universally-jointed shafts of known construction and the road wheels may be driven directly by said shafts or through spur reduction gearing arranged at each wheel in a known manner.

To ensure the equal distribution of fuel to the cylinders, the carburetter is preferably arranged to deliver the explosive mixture tangentially into an annular chamber placed around the crankshaft axis.

This chamber communicates through an orifice or orifices in its lower wall with a second annular chamber placed immediately beneath it, from which induction pipes are led off tangentially to the individual cylinders. The communicating orifice may take the form of an annular slot, or the two chambers may be combined in a single chamber having an inwardly projecting shelf running round same below the level at which the inlet pipe from the carburetter enters and above the level of the openings of the induction pipes to the individual cylinders.

With these arrangements the explosive mixture is caused to make one or more revolutions of the upper chamber or portion thereof, before descending to the lower chamber or portion thereof, in which latter the tangential arrangement of the induction pipes to the cylinders tends to maintain the whirling action of the mixture.

Thus no particular cylinder has any preference in mixture supply over the others, which might not be the case if all the cylinders drew from a simple chamber into which the carburetter delivered direct, for there would be a tendency for the particles of liquid fuel to be projected in excess down that particular induction pipe which happened to be more nearly opposite to the inlet pipe from the carburetter.

It will be observed that the placing of the engine with its crankshaft in a vertical plane and the cylinders projecting radially in a horizontal plane, also improves the distribution of fuel and lubricant, since all cylinders are at substantially the same level and none of them are inclined to the vertical.

The engine may conveniently be air cooled by means of fan blades carried on the edge of a flywheel mounted on the crankshaft above the engine and arranged to blow air downwards upon the cylinders.

When the above described combined engine, change-speed and transmission unit is mounted between the front wheels of a vehicle for example, the universally-jointed shafts may conveniently be arranged to permit the movement of the front wheels when steering the vehicle as well as permitting the up and down movements of the wheels due to road inequalities.

A suitable arrangement of transmission mechanism comprises a friction clutch arranged on the engine crankshaft just below the engine, this clutch transmitting the power to a change-speed gearbox of known form placed below.

The driven shaft of the gearbox carries a bevel wheel meshing with a crown wheel on the casing of the differential gear, which has its axis running across the car and runs in bearings immediately below the gearbox. Or a worm and worm wheel may be used instead of the bevel wheel and crown wheel, this latter being the preferred arrangement.

To enable the invention to be fully understood it will now be described by reference to the accompanying drawings in which:—

Fig. 1 is a part sectional diagrammatic plan view of a five cylinder engine constructed according to the invention with the fly wheel removed, Figs. 2 and 2ª read together are a sectional elevation taken through one of the cylinders thereof omitting the gearbox and drawn to a larger scale, Fig. 3 is a sectional elevation of the change-speed gear and differential box drawn to a smaller scale.

As shewn, the engine comprises five cylinders 4 arranged in a horizontal plane and driving a vertical crank shaft 5.

The valves 6 are arranged side by side, the induction pipes being shewn at 7 and the exhaust pipes at 8.

The crankshaft with its connecting rods is contained in a casing 9 (Fig. 2) adapted to be bolted to a casing 10 (Fig. 3) containing the change speed and differential gearing, so that the engine and the transmission gearing forms a complete unit.

Referring to Fig. 2, in which a section through one of the cylinders is shewn, it will be seen that the connecting rod 12 is connected to a master rod 12ª bearing on the crank pin 13, the crankshaft 5 being formed in two portions secured by a cone and nut. The crank may be balanced by weights 15 attached to the webs 14.

The valve rods 16 (one only being shown) are operated by a cam ring 17 surrounding the crankshaft and carried in the upper part of the crank casing and driven by a shaft 18 through gear wheels 19, 20 from the lower end of the crankshaft. A clutch 21 of any desired type is fitted at the lower end of the crankshaft 5. A hollow fly wheel 22 is mounted on the upper end of the crankshaft and is fitted with fan blades 23 for cooling purposes.

The essential portions of the gearbox are shewn in Fig. 3, the shaft 5ª being the driven shaft and having the gear wheels 24 fitted thereon co-operating with other gear wheels 25 carried on a lay shaft 26 to form a change speed gear of any suitable known type, the changing being controlled by the usual rods 27. The drive to the road wheels is transmitted to a horizontal shaft 28 running transversely of the engine through a differential 29, the differential casing having a worm wheel 30 engaging a worm 31 on the shaft 5ª. The whole gearing is contained in a casing 10 adapted to be bolted to the engine casing 9 and an oil sump is formed in a portion 32 from which oil is delivered to various portions of the engine and gear box by suitable means. Oil is also admitted to the gear box through an oil reservoir 33.

The various shafts may be grooved or hollow for lubrication purposes. Oil may be supplied to the crank shaft 5 by a pipe 34 (Fig. 2) drawing its supply from the sump 32, said shaft being provided with suitable oil passages 35.

The drive to the road wheels may be transmitted from the shaft 28 by means of independent universally jointed shafts of known construction through the medium of any suitable type of reduction or other gearing.

The explosive mixture from the carburetter drawn through pipe 36 is admitted into the upper portion 37 of an annular chamber 38 arranged around the upper end of the crank shaft 5 and divided into upper and lower portions by a partition 39. The two portions of the chamber communicate through an annular slot 40 in the partition and the induction pipes 7 to the cylinders open tangentially into the lower portion 41 of the chamber. With this arrangement the explosive mixture is caused to make one or more revolutions of the portion 37 before passing into the lower portion 41 and in the latter portion the tangential arrangement of the induction pipes 7 tends to maintain the whirling action of the mixture.

Further no particular cylinder has any preference in mixture supply over the others as the carburetter inlet pipe 36 opens into the upper portion 37 of the chamber.

Having thus described the nature of the said invention and the best means I know of carrying the same into practical effect, I claim:—

1. A power unit for installation between the wheels of a conventional type of motor vehicle, comprising an engine having horizontally arranged cylinders and a vertically disposed crank shaft, a casing secured against the under side of the engine, a change speed transmission in said casing, and a differential gearing in said casing, said transmission and differential gearing connected to said engine for driving the adjacent wheels of a motor vehicle.

2. A power unit adapted for positioning between a pair of wheels of a conventional type of motor vehicle, comprising a vertical crank shaft, radially extending cylinders arranged in a horizontal plane about the vertical crank shaft, a casing secured beneath the cylinders about the crank shaft, a change speed transmission arranged in said casing and connected to the crank shaft, and a differential gearing connected to the change speed transmission and arranged in said casing for direct connection with the adjacent wheels of the vehicle.

In testimony whereof I have signed my name to this specification.

OLIVER DANSON NORTH.